Aug. 12, 1930.                G. HITZLER                1,772,485
                           MECHANICAL REMINDER
                           Filed Nov. 15, 1928
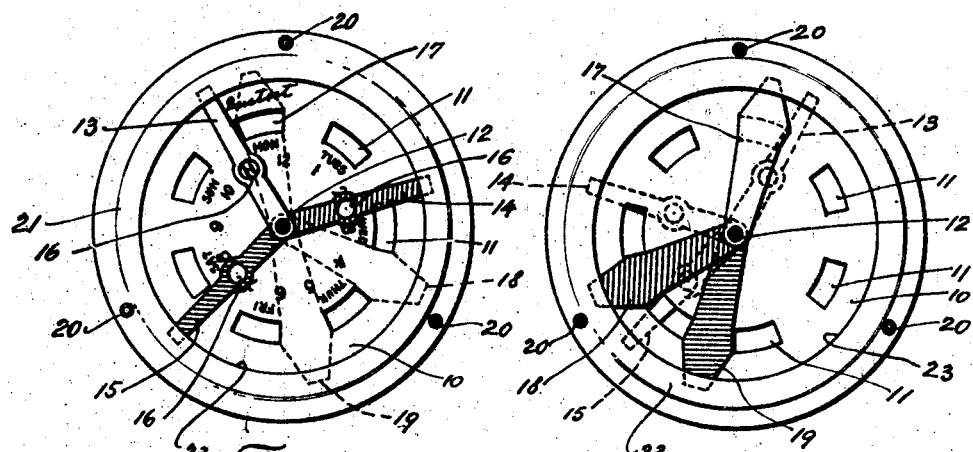
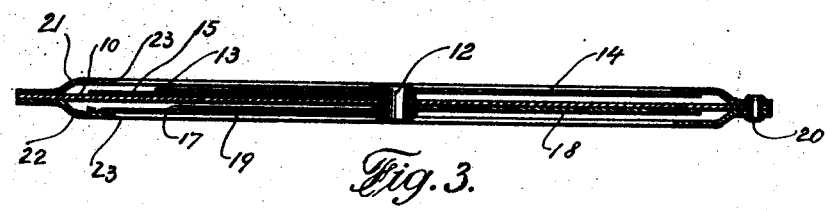
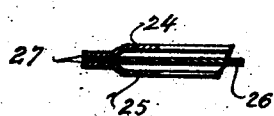 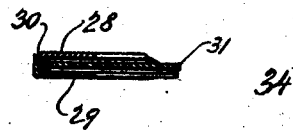 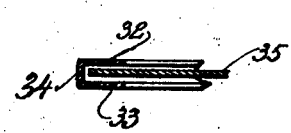
INVENTOR
George Hitzler
BY
ATTORNEY Patented Aug. 12, 1930

1,772,485

UNITED STATES PATENT OFFICE

GEORGE HITZLER, OF HOBOKEN, NEW JERSEY

MECHANICAL REMINDER

Application filed November 15, 1928. Serial No. 319,646.

This invention relates to mechanical reminders and its object is to provide a simple, inexpensive and handy device of this kind, which may be readily carried about the person without discomfort, and which is designed to remind one of the engagements or appointments when consulted.

Another object of my invention is to provide in such reminder, a member which may be called a calendar member provided with markings for days and hours, and indicators adjustable relative to said calendar member, and adapted to be set so as to define the day and hour at which an appointment has been made by the owner of the device.

A further object of my invention is to provide on the calendar member a space upon which may be temporarily written the object of an appointment.

A still further object of my invention is to provide the calendar member with annular recesses for guiding the indicator ends and for preventing such indicators from moving from the place or places at which they are set.

The foregoing and further objects will be more fully apparent from the accompanying drawing and the following description, forming part of this disclosure, and in which Figure 1 denotes the front view of a preferred form of my device, Figure 2 is a rear view thereof, Figure 3 is a cross sectional view through my device, and Figures 4, 5 and 6 illustrate modified detail views of various forms of the guard member of my device.

Referring to the figures, numeral 10 denotes the calendar member which is provided with seven perforations 11, which are arranged in a circle. Below each perforation there will be seen abbreviations of each day in the week also arranged in a circle. In a still smaller circle within the day markings, there will be observed numerals 1 to 12, indicating the hours of the day.

At the center of the perforated calendar member, there will be seen a hollow rivet 12, which holds at the front face of the member, three indicators marked 13, 14 and 15, which are preferably of different colors. Each of the indicators is provided with an aperture 16, adapted to permit the reading of the numerals indicating hours. At the back or rear face of the calendar member there will be seen three indicators marked 17, 18 and 19.

These indicators are colored also differently, but one front indicator, for instance, that marked 13, will correspond in color to indicator 17, while front indicator 14 corresponds to back indicator 18 and front indicator 15 corresponds in color to back indicator 19.

The rear indicators are also held by rivet 12 and are so constructed that their width at the circle space in which apertures 11 are provided, correspond to the width of the connection between two apertures 11. These rear indicators are visible from the front of the calendar member through apertures 11 when they are placed just below the latter. Thus, in Figure 1 there will be observed that indicator 17, is made visible through the aperture marked Mon., while rear indicators 18 and 19 are not visible since they are placed between apertures marked Wed. and Thur. and Thur. and Fri., respectively.

At the periphery of the calendar member there will be seen attached at each face of it and secured to the edge thereof by rivets 20, guard 21 and rear guard 22. The inner edge 23 of these guards is spaced from the faces of the calendar member so as to provide annular recesses between the guard and the annular member for accommodating the extreme edges of the indicators. These indicator ends are guarded within the recesses so that a misplacement of the indicators from their set position is prevented.

The arrangement of the guards 21 and 22 is clearly seen in Figure 3, which shows an enlarged cross sectional view through the calendar member.

In Figure 1 it will be observed that a space is formed between the inner edge of guard 21 and the perforations in the calendar member, and that above the aperture marked Mon. there is written the word "Dentist." This inscription may be preferably written in pencil and erased when not wanted.

In this figure, indicator 17 is placed below the aperture marked Mon. and indicator 13, which is of the same color as indicator 17, is placed over numeral 11. This setting reminds the owner of the device that he has an appointment with the dentist on Mon. at 11 a. m. Similarly, appointments may be marked by the setting of the rest of the indicators.

In Figures 1, 2 and 3, I have shown only three indicators in each setting. Be it understood, however, that any number of indicators may be provided in my device without departing from the broad scope of my idea.

In Figure 4 is shown a different arrangement of guard members, in connection with the calendar member. In this figure, front guard member 24 and rear guard member 25 are glued to calendar member 26 at 27 so as to form a continuous union between the three members.

In Figure 5 a box-like affair is shown which consists of a front guard member 28 and a rear guard member 29, telescoping and connected with each other at 30, and enclosing calendar member 31.

A still other modified form is shown in Figure 6, where front guard member 32 and rear guard member 33 are made of one piece joined at 34, into which is sprung calendar member 35.

The modifications shown in Figures 4, 5, and 6, represent only few possible forms of guards for the indicators, and it is obvious that other constructions may be employed in my device.

From the foregoing it will be evident that my invention resides primarily in the provision of a calendar member equipped at its front and rear face with two sets of indicators, adapted to be operated jointly, and in which the indicators of the front set correspond in colors, or other identification marks, to the indicators of the rear set, so that the corresponding indicators may be jointly employed for setting the device to remind one of a certain date.

Be it understood therefore that no matter how the construction of my device be changed, the basic idea will remain paramount.

I therefore reserve for myself the right to make changes and improvements within the scope of my invention for which I claim:

1. A mechanical reminder, comprising in combination, a disc-shaped calendar member provided with a plurality of perforations and day and hour markings, said perforations corresponding to the day markings, two sets of indicators centrally and adjustably attached to said member, one set at the front, the other at the back thereof, the front set adapted to indicate hours while the indicators of the back set serve for defining days and are adapted to be visible through the perforations in said member, a double rim provided at the periphery of said calendar member, its inner edges being spaced from the latter, so as to form annular recesses, the ends of said indicators of both sets extending into their respective recesses, thereby being guarded against dislocation after being set.

2. A mechanical reminder, comprising in combination, a disc-shaped calendar member provided with day and hour markings and a plurality of perforations corresponding to the day markings, a plurality of differently colored indicators centrally associated with said member and adapted to be adjustable relative to the latter, said indicators divided into two sets, one set arranged at the front and the other at the rear face of said member, the colors of the indicators of one set corresponding to the indicator colors of the other set, the indicators of the rear set adapted to be visible from the front through the perforations in said member, annular guard rims provided at the periphery of said member and so arranged as to form at each face thereof annular recesses opening toward the center and adapted to accommodate the ends of said indicators, a space provided between said rims and said perforation adapted to be used for writing.

In testimony whereof I affix my signature.

GEORGE HITZLER.